(12) United States Patent
Bilkhu et al.

(10) Patent No.: US 8,296,401 B2
(45) Date of Patent: Oct. 23, 2012

(54) MESSAGING SCRIPT FOR COMMUNICATIONS SERVER

(75) Inventors: Baljeet S. Bilkhu, Kitchener (CA); Andrew C. Smith, Waterloo (CA); Tsz-Kin Gary Wong, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1459 days.

(21) Appl. No.: 11/329,031

(22) Filed: Jan. 11, 2006

(65) Prior Publication Data

US 2007/0162548 A1    Jul. 12, 2007

(51) Int. Cl.
- *G06F 15/177* (2006.01)
- *G06F 15/173* (2006.01)
- *G06F 15/16* (2006.01)

(52) U.S. Cl. ........ 709/220; 709/221; 709/222; 709/223; 709/248

(58) Field of Classification Search .......... 709/220–223, 709/248
See application file for complete search history.

(56) References Cited

U.S. PATENT DOCUMENTS

| | | | | |
|---|---|---|---|---|
| 5,841,982 A * | 11/1998 | Brouwer et al. | ............... | 709/224 |
| 6,158,031 A * | 12/2000 | Mack et al. | ................... | 714/724 |
| 6,408,335 B1 * | 6/2002 | Schwaller et al. | ........... | 709/224 |
| 6,434,502 B1 * | 8/2002 | Harrison | ..................... | 702/122 |
| 6,522,995 B1 * | 2/2003 | Conti et al. | ................... | 702/184 |
| 6,549,882 B1 * | 4/2003 | Chen et al. | ...................... | 703/21 |
| 6,609,084 B2 * | 8/2003 | Midde Peddanna | .......... | 702/186 |
| 6,959,324 B1 * | 10/2005 | Kubik et al. | .................. | 709/206 |
| 6,988,134 B2 * | 1/2006 | Thorpe et al. | ................. | 709/223 |
| 7,020,573 B2 * | 3/2006 | Wheeler et al. | ............... | 702/121 |
| 7,069,278 B2 * | 6/2006 | Telkowski et al. | ............ | 707/204 |
| 7,424,384 B2 * | 9/2008 | Wheeler et al. | ............... | 702/121 |
| 2002/0028659 A1 * | 3/2002 | Adams et al. | ................ | 455/67.1 |
| 2002/0138590 A1 * | 9/2002 | Beams et al. | ................. | 709/218 |
| 2003/0063580 A1 * | 4/2003 | Pond | ............................. | 370/328 |
| 2003/0163770 A1 * | 8/2003 | Webster et al. | ................. | 714/47 |
| 2004/0128651 A1 * | 7/2004 | Lau | ................. | 717/124 |
| 2004/0260764 A1 * | 12/2004 | Witchel | ........................ | 709/202 |
| 2005/0071447 A1 * | 3/2005 | Masek et al. | .................. | 709/223 |
| 2005/0097175 A1 * | 5/2005 | Vandeputte | ................... | 709/206 |
| 2005/0187971 A1 * | 8/2005 | Hassan et al. | ............. | 707/104.1 |

(Continued)

FOREIGN PATENT DOCUMENTS

EP    1569481 A    8/2005

(Continued)

OTHER PUBLICATIONS

Giuseppe et al.,. "Testing Web-based applications: The state of the art and future trends", Information and Software Technology 48 (2006) 1172-1186, Available online Aug. 22, 2006.*

(Continued)

*Primary Examiner* — David Lazaro
*Assistant Examiner* — Edward Kim
(74) *Attorney, Agent, or Firm* — Perry + Currier Inc.; Kristjan Spence

(57) ABSTRACT

For use in a communication system, a method of testing communications between at least one enterprise server and at least one handheld mobile communication device, the method comprising automatically sending a plurality of test messages from the enterprise server to the handheld mobile communication device. Also set forth is a method for verifying correct receipt of the test messages and reporting the verification results.

8 Claims, 16 Drawing Sheets

U.S. PATENT DOCUMENTS

| | | | |
|---|---|---|---|
| 2005/0198246 A1* | 9/2005 | Kegel | 709/223 |
| 2006/0136579 A1* | 6/2006 | Linville et al. | 709/223 |
| 2007/0058658 A1* | 3/2007 | Ruckart | 370/444 |
| 2007/0124305 A1* | 5/2007 | Smith et al. | 707/10 |
| 2008/0244233 A1* | 10/2008 | Wilson et al. | 712/216 |

FOREIGN PATENT DOCUMENTS

| | | |
|---|---|---|
| GB | 2346774 A | 8/2000 |

OTHER PUBLICATIONS

Apfelbaum, L., "Automated functional test generation", AutoTest Con '95 'Systems Readiness: Test Technology for the 21st Century'. Conference Record, p. 101-107, IDBN 0-7803-2621-0, Aug. 8-10, 1995.*

European Search Report, European Patent Office, Jun. 19, 2006, Munich.

* cited by examiner

```
'Acceptance script

Option Public

Dim flag As Integer

Dim gstrObjPath As String

Dim tmpWord As String

Dim theMessage as String

Dim numAddresses As Integer

DIM EmailArray() As String

Sub initialize
        Dim MsgSize As Double
 Dim subject As String

Dim s As notessession

Dim db As notesdatabase

Dim vw As notesview

Dim doc As notesdocument

Dim StrName As String

Dim counter As Integer

Set s = New notessession

Set db = s.currentDatabase

Set vw =db.getView("People")

StrName = s.CommonUserName
```

Figure 4A

```
'get all of the email addresses that will be redirected to the handheld numAddresses = Cint (InputBox ("Please enter the number of email addresses that you would like to
send emails to"))

redim EmailArray(numAddresses)

Do While counter < numAddresses

EmailAddress = ""

EmailAddress = InputBox ("Please enter in email address ")

EmailArray(counter) = EmailAddress counter = counter + 1

Loop

'execute test case #2 of the Mail Transfer section subject = "test #2-Acceptance-Mail Transfer section"

MsgSize = 100 flag = 0

Call SendMessage(strName, subject, MsgSize,flag)

'execute test case #3 of the Mail Transfer section subject = "test #3-Acceptance-Mail Transfer section"

MsgSize = 0 flag = 0

Call SendMessage(strName, subject, MsgSize,flag)

'execute test case #4 of the Mail Transfer section subject = ""

MsgSize = 500 flag = 0

Call SendMessage(strName, subject, MsgSize,flag)
```

Figure 4B

```
'execute test case #5 of the Mail Transfer section
    subject = "test #5-Acceptance-Mail Transfer section"
    MsgSize = 0
    flag = 1
Call SendMessage(strName, subject, MsgSize,flag)

'execute test case #6 of the Mail Transfer section
    subject =
"aaaaaaaaaabbbbbbbbbbccccccccccddddddddddeeeeeeeeeeffffffffffggggggggggghhhhhhhhhhiiiiiiiiiijjjjjjjjjj
jkkkkkkkkkkllllllllllmmmmmmmmmmnnnnnnnnnnooooooooooppppppppppqqqqqqqqqqrrrrrrrrrrssssssssssstttttttttt
tuuuuuuuuuuvvvvvvvvvvwwwwwwwwwwxxxxxxxxxxyyyyyyyyyyzzzzzz"
    MsgSize = 50
    flag = 0
Call SendMessage(strName, subject, MsgSize,flag)

'execute test case #7 of the Mail Transfer section
    subject =
"aaaaaaaaaabbbbbbbbbbccccccccccddddddddddeeeeeeeeeeffffffffffggggggggggghhhhhhhhhhiiiiiiiiiijjjjjjjjjj
jkkkkkkkkkkllllllllllmmmmmmmmmmnnnnnnnnnnooooooooooppppppppppqqqqqqqqqqrrrrrrrrrrssssssssssstttttttttt
tuuuuuuuuuuvvvvvvvvvvwwwwwwwwwwxxxxxxxxxxyyyyyyyyyyzzzzzz"
    MsgSize = 0
    flag = 1
Call SendMessage(strName, subject, MsgSize,flag)

'execute test case #8 of the Mail Transfer section
    subject = ""
    MsgSize = 0
    flag = 0
Call SendMessage(strName, subject, MsgSize,flag)
```

Figure 4C

```
'test case #9 must be done from the device

'execute test case #10 of the Mail Transfer section
subject = "test #10-Acceptance-Mail Transfer section"
MsgSize = 500
flag = 2
Call SendMessage(strName, subject, MsgSize,flag)

'execute test case #11 of the Mail Transfer section
subject = "test #11-Acceptance-Mail Transfer section"
MsgSize = 500
flag = 3
Call SendMessage(strName, subject, MsgSize,flag)

'execute test case #12 of the Mail Transfer section
subject = "test #12-Acceptance-Mail Transfer section"
MsgSize = 500
flag = 4
Call SendMessage(strName, subject, MsgSize,flag)

'execute test case #13 of the Mail Transfer section
subject = "test #13-Acceptance-Mail Transfer section"
MsgSize = 0
flag = 5
Call SendMessage(strName, subject, MsgSize,flag)

'execute test case #2 of the Attachment Viewing section
subject = "test #2-Acceptance-Attachment Viewing section"
MsgSize = 0
flag = 6
Call SendMessage(strName, subject, MsgSize,flag)
```

Figure 4D

```
'execute test case #3 of the Attachment Viewing section
subject = "test #3-Acceptance-Attachment Viewing section"
MsgSize = 0
flag = 7
Call SendMessage(strName, subject, MsgSize,flag)

'execute test case #4 of the Attachment Viewing section
subject = "test #4-Acceptance-Attachment Viewing section"
MsgSize = 0
flag = 8
Call SendMessage(strName, subject, MsgSize,flag)

'execute test case #5 of the Attachment Viewing section
subject = "test #5-Acceptance-Attachment Viewing section"
MsgSize = 0
flag = 9
Call SendMessage(strName, subject, MsgSize,flag)

'execute test case #6 of the Attachment Viewing section
subject = "test #6-Acceptance-Attachment Viewing section"
MsgSize = 0
flag = 10
Call SendMessage(strName, subject, MsgSize,flag)

'execute test case #7 of the Attachment Viewing section
subject = "test #7-Acceptance-Attachment Viewing section"
MsgSize = 0
flag = 11
Call SendMessage(strName, subject, MsgSize,flag)
```

Figure 4E

```
'execute test case #8 of the Attachment Viewing section
subject = "test #8-Acceptance-Attachment Viewing section - with body"
MsgSize = 100
flag = 12
Call SendMessage(strName, subject, MsgSize,flag)

'execute test case #8 of the Attachment Viewing section
subject = "test #8-Acceptance-Attachment Viewing section - no body"
MsgSize = 0
flag = 12
Call SendMessage(strName, subject, MsgSize,flag)

'execute test case #9 of the Attachment Viewing section
subject = "test #9-Acceptance-Attachment Viewing section"
MsgSize = 0
flag = 13
Call SendMessage(strName, subject, MsgSize,flag)

'execute test case #10 of the Attachment Viewing section
theMessage = |·Execute the fowarding of .vcf attachment test case
·Then click ok|
Result = MessageBox (theMessage,65, "Acceptance Test Plan - Attachment Viewing - #10")

'user selects cancel, end the program
if Result = 2 then
    End
End if

'execute test case #1 of the Miscellaneous testing section
theMessage = |·   From Enterprise Server Admin, under the Tools menu, select the APB option.
·Type in a Subject and Message
·Send direct to all users on the Enterprise Server.
·Then click ok|
Result = MessageBox (theMessage,65, "Acceptance Test Plan - Miscellaneous testing - #1")
```

Figure 4F

```
'user selects cancel, end the program
if Result = 2 then
    End
End if

'execute test case #2 of the Miscellaneous testing section
theMessage = |·    From Enterprise Server Admin, under the Tools menu, select the APB option.
·Type in a Subject and Message
·Send via-email to all users on the Enterprise Server.|
Result = MessageBox (theMessage,65, "Acceptance Test Plan - Miscellaneous testing - #2")

'user selects cancel, end the program
if Result = 2 then
    End
End if

'execute test case #3 of the Miscellaneous testing section
theMessage = |·Ensure that a cradle is connected to a Server / PC
that currently has Enterprise Server Admin on it.
·Insert the device of any user into this cradle.
·From Enterprise Server Admin,select a user that does not
have a device and go to the
Tools -> Settings menu item, click on the Detect button.
·Then click ok.|
Result = MessageBox (theMessage,65, "Acceptance Test Plan - Miscellaneous testing - #3")

'user selects cancel, end the program
if Result = 2 then
    End
End if
```

Figure 4G

```
'execute test case #4 of the Miscellaneous testing section
theMessage = |·From Enterprise Server Admin, click on the Auto BCC button.
·Click on the Add... button
·Enter the email of UserA
in the Email Address field and OK.
·From the Handheld Device of UserB, compose and send an
email to Users C, D and E.
·Then click ok.|
Result = MessageBox (theMessage,65, "Acceptance Test Plan - Miscellaneous testing - #4")

'user selects cancel, end the program
if Result = 2 then
    End
End if

'execute test case #5 of the Miscellaneous testing section
theMessage = |·Turn off the radio and Handheld Device of UserB.
·When you click ok, five messages will be
sent to the handheld of this user|
Result = MessageBox (theMessage,65, "Acceptance Test Plan - Miscellaneous testing - #5")

'user selects cancel, end the program
if Result = 2 then
    End
End if subject = "m1"
MsgSize = 0
flag = 0
theWord = "              The first message with the radio off"
Call SendMessage(strName, subject, MsgSize, flag)
```

Figure 4H

```
subject = "m2"
MsgSize = 0
flag = 0
theWord = "                    The second message with the radio off"
Call SendMessage(strName, subject, MsgSize, flag)

subject = "m3"
MsgSize = 0
flag = 0
theWord = "                    The third message with the radio off"
Call SendMessage(strName, subject, MsgSize, flag)

subject = "m4"
MsgSize = 0
flag = 0
theWord = "                    The fourth message with the radio off"
Call SendMessage(strName, subject, MsgSize, flag)

subject = "m5"
MsgSize = 0
flag = 0
theWord = "                    The fifth message with the radio off"
Call SendMessage(strName, subject, MsgSize, flag)

theMessage = |·Five messages were just sent this user's handheld.
·Wait until all five messages become pending for it.
·Select UserB from Enterprise Server Admin and then click on the "Purge Pending" button.
·Turn back on the Handheld Device (and radio) of UserB
and wait about 5 minutes or so.
·Then click ok.|
Result = MessageBox (theMessage,65, "Acceptance Test Plan - Miscellaneous testing - #5")
```

Figure 4I

```
'user selects cancel, end the program
    if Result = 2 then
            End
    End if theMessage = |You may now execute the remainder of this test plan manually|
    Result = MessageBox (theMessage,65, "Acceptance Test Plan - Miscellaneous testing - #6")

'user selects cancel, end the program
    if Result = 2 then
            End
    End if End Sub Function SendMessage(recip As String, subj As String, msgsize As Double, flag As Integer) As Integer
    '   msgsize is the size of the message in kb
    '   a word is between 1 and 12 chars long.

Dim session As New NotesSession
    Dim MaxWordSize As Integer
    Dim db As NotesDatabase
    Dim MailDoc As NotesDocument
    Dim MsgBody As NotesRichTextItem
    Dim alphabet As String
    Dim numBytes As Double
    Dim j As Integer
    Dim i As Integer
    Dim iters As Integer MaxWordSize = 12
    i = 1
    iters = 200

Set db = session.CurrentDatabase
    On Error Goto ErrHandler alphabet = "abcdefghijklmnopqrstuvwxyzABCDEFGHIJKLMNOPQRSTUVWXYZ,.;?! +=[]{}\|<>()*&^%$#@!"

Set MailDoc = New NotesDocument(db)
    MailDoc.Form = "Memo"

if flag =2 then
            MailDoc.CopyTo = recip
            MailDoc.SendTo = ""
    Elseif flag = 3 then
            MailDoc.BlindCopyTo = recip
            MailDoc.SendTo = ""
    Else
            MailDoc.SendTo = recip
    End if MailDoc.Subject = subj
    Set MsgBody = MailDoc.CreateRichTextItem("Body")
```

Figure 4J

```
        Randomize
        'not this will not create a msg exactly MsgSize in lenght, it may be off by approximatly 10-15
bytes
        'however I have deemed that to be acceptable for our testing
        If flag = 1 then
                tmpword =
"aaaaaaaaaabbbbbbbbbbccccccccccddddddddddeeeeeeeeeeffffffffffggggggggggghhhhhhhhhhiiiiiiiiiiijjjjjjjjjjkk
kkkkkkkkllllllllllmmmmmmmmmmnnnnnnnnnnooooooooooppppppppppqqqqqqqqqqrrrrrrrrrrssssssssssttttttttttuuuuu
uuuuuvvvvvvvvvvwwwwwwwwwwxxxxxxxxxxyyyyyyyyyyzzzzz"
                Call MsgBody.AppendText(tmpWord)
                MailDoc.Send(False)
                CreateNotification = True Elseif flag = 5 then Call MsgBody.AppendText("THIS IS THE FIRST LINE")
                Call MsgBody.AddNewLine(2)
                Do While i < iters
                        Call MsgBody.AppendText("abcdefghijklmnopqrstuvwxyz")
                        Call MsgBody.AddNewLine(2)
                        i = i +1
                Loop
                Call MsgBody.AppendText("THIS IS THE LAST LINE")
                MailDoc.Send(False)
                CreateNotification = True Else
                if flag = 4 then
                        gstrObjPath = "C:\attachments\test.txt"
                        Set object = MsgBody.EmbedObject (EMBED_ATTACHMENT, "", gstrObjPath, "" )
                Elseif flag = 6 then
                        gstrObjPath = "C:\attachments\3 Worksheets.xls"
                        Set object = MsgBody.EmbedObject (EMBED_ATTACHMENT, "", gstrObjPath, "" )
                Elseif flag = 7 then
                        gstrObjPath = "C:\attachments\1kb.txt"
                        Set object = MsgBody.EmbedObject (EMBED_ATTACHMENT, "", gstrObjPath, "" )
                Elseif flag = 8 then
                        gstrObjPath = "C:\attachments\TOC and Contents.doc"
                        Set object = MsgBody.EmbedObject (EMBED_ATTACHMENT, "", gstrObjPath, "" )
                Elseif flag = 9 then
                        gstrObjPath = "C:\attachments\AirDoc Enterprise Technology.ppt"
                        Set object = MsgBody.EmbedObject (EMBED_ATTACHMENT, "", gstrObjPath, "" )
                Elseif flag = 10 then
                        gstrObjPath = "C:\attachments\PPS File.pps"
                        Set object = MsgBody.EmbedObject (EMBED_ATTACHMENT, "", gstrObjPath, "" )
                Elseif flag = 11 then
                        gstrObjPath = "C:\attachments\Reader.pdf"
                        Set object = MsgBody.EmbedObject (EMBED_ATTACHMENT, "", gstrObjPath, "" )
                Elseif flag = 12 then
                        gstrObjPath = "C:\attachments\PEY Administration.vcf"
                        Set object = MsgBody.EmbedObject (EMBED_ATTACHMENT, "", gstrObjPath, "" )
                Elseif flag = 13 then
                        gstrObjPath = "C:\attachments\PEY Administration.vcf"
                        Set object = MsgBody.EmbedObject (EMBED_ATTACHMENT, "", gstrObjPath, "" )
                        gstrObjPath = "C:\attachments\.vcf"
                        Set object = MsgBody.EmbedObject (EMBED_ATTACHMENT, "", gstrObjPath, "" )
                        gstrObjPath = "C:\attachments\Waterloo Taxi.vcf"
                        Set object = MsgBody.EmbedObject (EMBED_ATTACHMENT, "", gstrObjPath, "" )
                        gstrObjPath = "C:\attachments\YD Waterloo.vcf"
                        Set object = MsgBody.EmbedObject (EMBED_ATTACHMENT, "", gstrObjPath, "" )
                End if
```

Figure 4K

```
            Do While numBytes < MsgSize

'create a word 12 letters or less
                    tmpWord = ""
                    For j = 1 To ((MaxWordSize - 1) * Rnd() + 1)

'concatenate random letter from alphabet to the tempword
                            tmpWord = tmpWord + Mid(alphabet,((( (Len(alphabet)) - 1 ) * Rnd() +
1)),1)   ' finds a random char in alphabet string numBytes = numBytes+1
                    Next j 'Add a space between the words, increment # of bytes and add to the msgBody
                    tmpword = tmpword + " "
                    numBytes = numBytes+1
                    Call MsgBody.AppendText(tmpWord)

If ((10 - 1) * Rnd() + 1) < 1 Then   ' 1 in 10 times it will add newlines
                            Call MsgBody.AddNewLine(2)
                            numBytes = numBytes+2  '2 bytes for a carriage return
                    End If
            Loop Call MailDoc.Send(False,EmailArray)
            CreateNotification = True
       End if
       Exit Function ErrHandler:
       Messagebox "Error (trapped by ErrHandler): " & Str(Err) & ": " & Error$
       CreateNotification = False
       Exit Function
End Function
Sub Terminate End Sub
```

Figure 4L

MESSAGING SCRIPT FOR COMMUNICATIONS SERVER

FIELD

A portion of the disclosure of this patent document contains material which is subject to copyright protection. The copyright owner has no objection to the facsimile reproduction by any of the patent document or patent disclosure, as it appears in the Patent and Trademark Office patent file or records, but otherwise reserves all copyrights whatsoever.

The following is directed in general to communication systems, and more particularly to a method of automatically sending multiple electronic mail (email) messages from a communications server to a mobile communication device and verifying correct receipt of the messages within the mobile communication device.

BACKGROUND

Mobile communication devices (hereinafter "handheld devices") are becoming increasingly popular for business and personal use due to a relatively recent increase in the number of services and features that the devices and mobile infrastructure support. Handheld devices, sometimes referred to as mobile stations, are essentially portable computers having wireless capability, and come in various forms. These include Personal Digital Assistants (PDAs), cellular phones and smart phones equipped with receivers and transmitters for communicating over a wireless network.

In order to facilitate communications and manage delivery of services to users of handheld devices within an enterprise, it is known to use one or more enterprise servers. These servers provide functionality and components that monitor services (such as provided by additional attachment servers, web servers, etc.) as well as process, route, compress and encrypt data for transmission to and from handheld devices connected to the wireless network.

It is known that certain email messages sent from the enterprise server to a handheld device may cause the server to "crash". Accordingly, it is desirable to test all varieties of email messages that may cause the server to crash, before the server is deployed. However, there are many different possible combinations of email messages, any one of which may cause the server to crash. In order to test even a small subset of all possible messages, the messages must be manually composed at a server mail client and then sent to the handheld device. This is a very time consuming task for testers. Consequently, many enterprise servers are not fully tested before deployment to ensure that the email functionality is operating correctly.

BRIEF DESCRIPTION OF THE DRAWINGS

A detailed description of the preferred embodiment is set forth in detail below, with reference to the following drawings, in which:

FIG. 4, comprising FIGS. 4A-4L, shows an exemplary script for implementing the method of the preferred embodiment.

DETAILED DESCRIPTION

Figure 1:
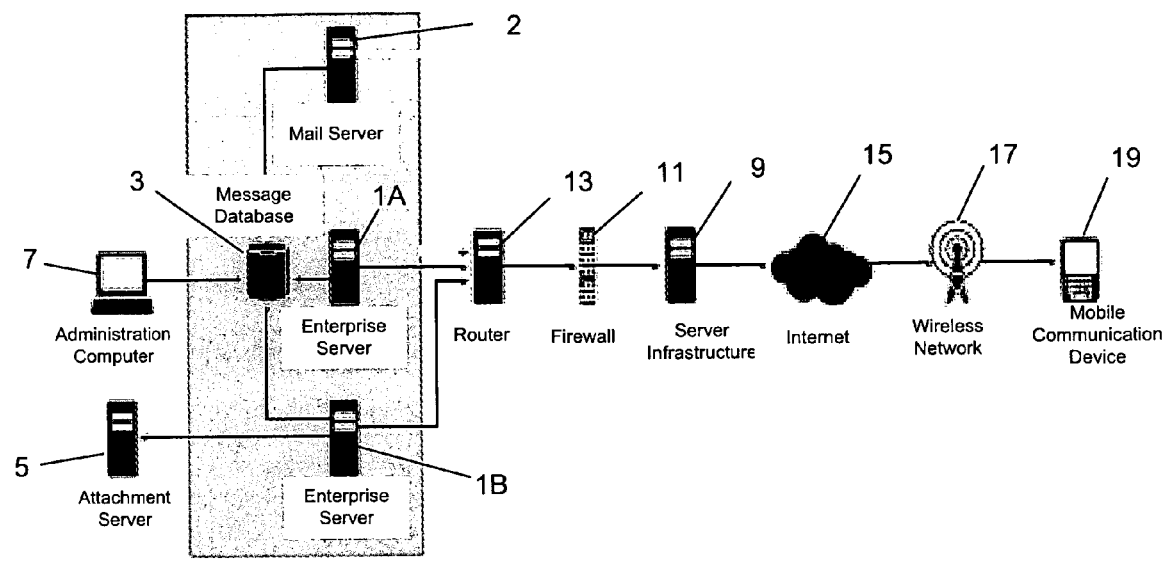
FIG. 1 is a block diagram showing a typical enterprise server architecture with remote components.

With reference to FIG. 1, a typical enterprise server configuration is shown with enterprise servers 1A and mail server 2 connected to a message database 3. Enterprise server 1B is also connected to an attachment server 5. An administration computer 7 executes administration software for managing operation of the multiple servers 1A and 1B. The enterprise servers 1A and 1B connect to a server infrastructure 9, through firewall 11, using a router 13. The server infrastructure 9 is connected to the Internet 15 which, in turn, communicates with a plurality of hand-held devices, such as device 19, via wireless network 17. Operation of the architecture shown in FIG. 1 would be well known to a person of ordinary skill in the art.

Figure 2:
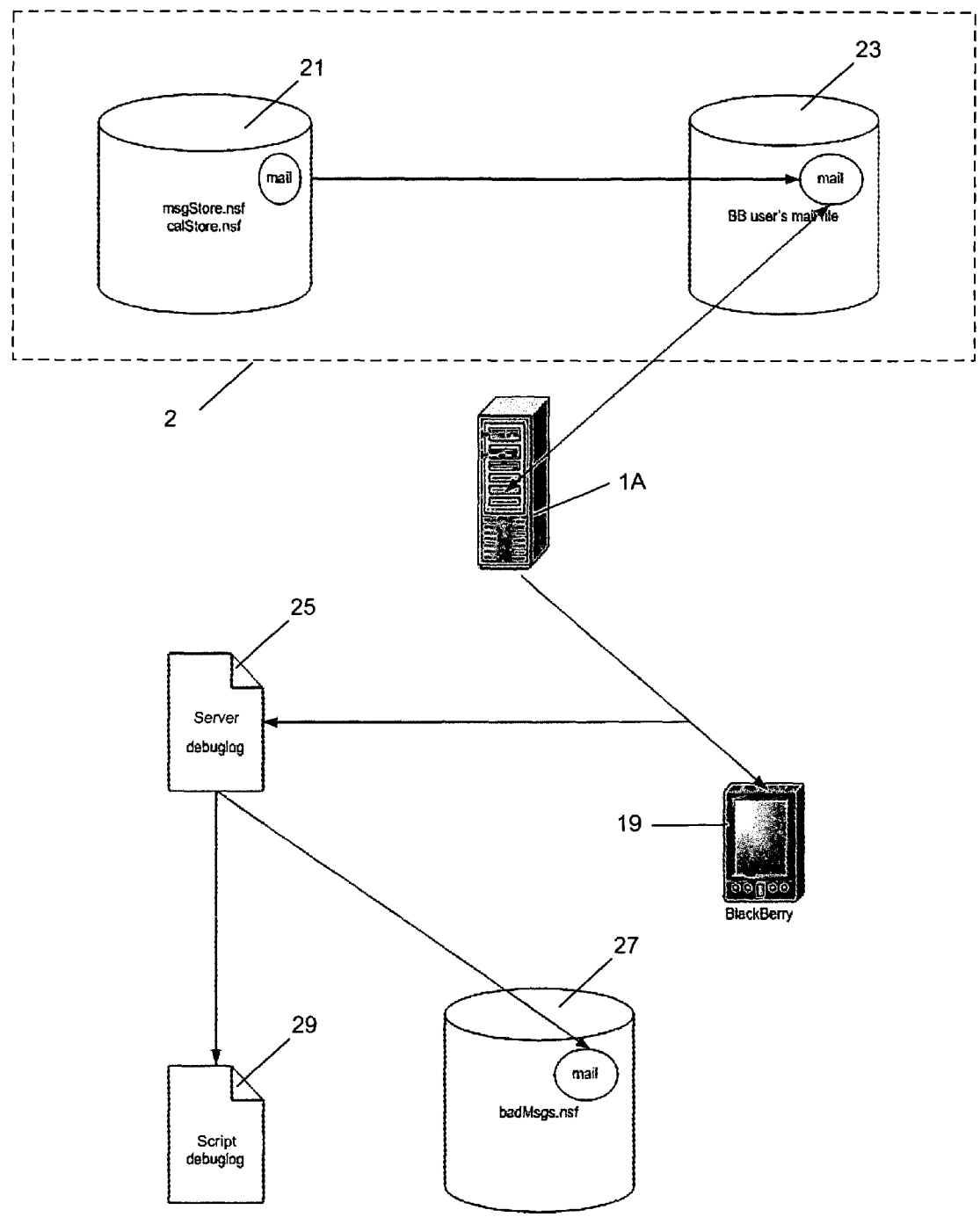
FIG. 2 is a diagram showing the method of the preferred embodiment.

As discussed in greater detail below, in order to test email functionality an administrator interacts with an enterprise server (e.g. server 1A) to execute a script from an email client associated with a mail account on mail server 2 (e.g. IBM Lotus Domino, Microsoft Exchange, etc.) that the enterprise server 1A interacts with to retrieve messages and other data, as discussed in greater detail in connection with FIG. 2. The script inputs the SMTP addresses of multiple users of handheld devices 19, in response to which messages are automatically sent to the handheld devices 19. This drastically cuts down on the amount of time required to test messaging. The administrator is automatically sent a test report once the emails have been sent to the device 19 and checked for error-free delivery, thereby relieving the administrator from having to manually examine each message on the device 19 to ensure proper delivery. The report can be delivered either after all of the messages from the script have been received, or in response to a specific message sent from the client messaging script.

According to the preferred embodiment, the script also automates attachment processing and regression testing. Regression testing allows the administrator to copy calendar entries from the handheld user's mail file to the device 19 and/or use calendar entry templates to generate non-recurring calendar entries in the handheld user's mail file.

At the end of the test, the script generates one or more text files that log the results of the test. If the script detects any errors during its execution, it copies the failed mail messages to a database. Manual testing may then be performed on the failed mail messages/attachments to ensure that they are, in fact, the cause of errors on the enterprise server. A summary of the results may be sent to the administrator via email once the test is complete. The email has the detailed text logs attached to it for easy viewing. The administrators' email addresses may be specified in an INI file (configuration file taken as input by the script) or some other form of user input.

Accordingly, there is provided a communication system having at least one enterprise server (1A, 1B, 1C) for facilitating communications and delivery of services to handheld mobile communication devices (19) associated with users, wherein the communication system includes an automated script for testing communications by automatically sending a plurality of test messages from the at least one enterprise server (1A, 1B, 1C) to at least one of the handheld mobile communication devices (19) associated with at least one user.

Also set forth is a method of testing communications between at least one enterprise server (1A, 1B, 1C) and at least one handheld mobile communication device (19), the method comprising automatically sending a plurality of test messages from the at least one enterprise server (1A, 1B, 1C) to the at least one handheld mobile communication device (19).

Figure 3:
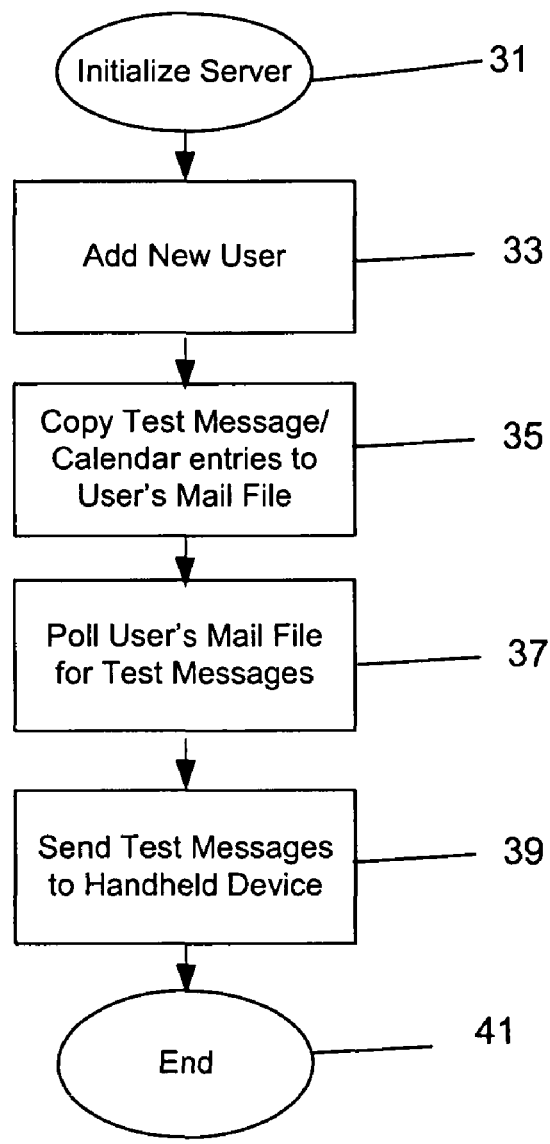
FIG. 3 is a flowchart showing execution of an automated script according to the preferred embodiment.

Operation of the script is described with reference to FIG. 2 in conjunction with FIG. 1, and the flowchart of FIG. 3, whereby a fictional or 'dummy' handheld user is created on the enterprise server 1A, email messages are sent to the user's handheld device 19, and the results of sending those emails are reported back to the administrator.

First, the administrator prepares the server 1A for use as an enterprise server (step 31), and ensures that the automated script is installed. The fictional user is then added to the server 1A as a new user (step 33), in the enterprise server's email directory. The recipient SMTP addresses may be specified in an INI file and read by the script upon initialization. Alternatively, the script may prompt the administrator to input the addresses manually. In any event, the method of input is not important to an understanding of the system and method set forth herein.

Next, the script is executed within the enterprise server 1A, whereupon test message/calendar entries are copied (step 35) from a database 21 (mdgStore.nsf/calStore.nsf) to the user's mail file 23 within the mail server 2. The enterprise server 1A then polls the user's mail file for new messages (step 37), resulting in a plurality of test email messages being sent to handheld device 17 via the wireless network 17 (step 39).

The test messages contain a variety of subject, body, and recipient combinations. Details of an exemplary script are set forth in FIG. 4, from which it will be noted that test messages are sent with subject and no body; no subject and no body; large body and small subject; large body and large subject; small body and large subject; small body and small subject; subject and body including only characters; subject and body including only symbols; messages with only a cc'd user; messages with only a bcc'd user, and others. The script of the preferred embodiment is suitable for use with Lotus Notes®, although a person of ordinary skill in the art will understand that scripts with similar functionality easily be written for use with other mail applications. The script also references certain attachments (.txt, .doc, vcf., .pps, .ppt, etc.) to the test email messages. Specifics of the attachments are not set forth herein, although it is within the abilities of a person of ordinary skill in the art to create such attachments.

Figure 5:
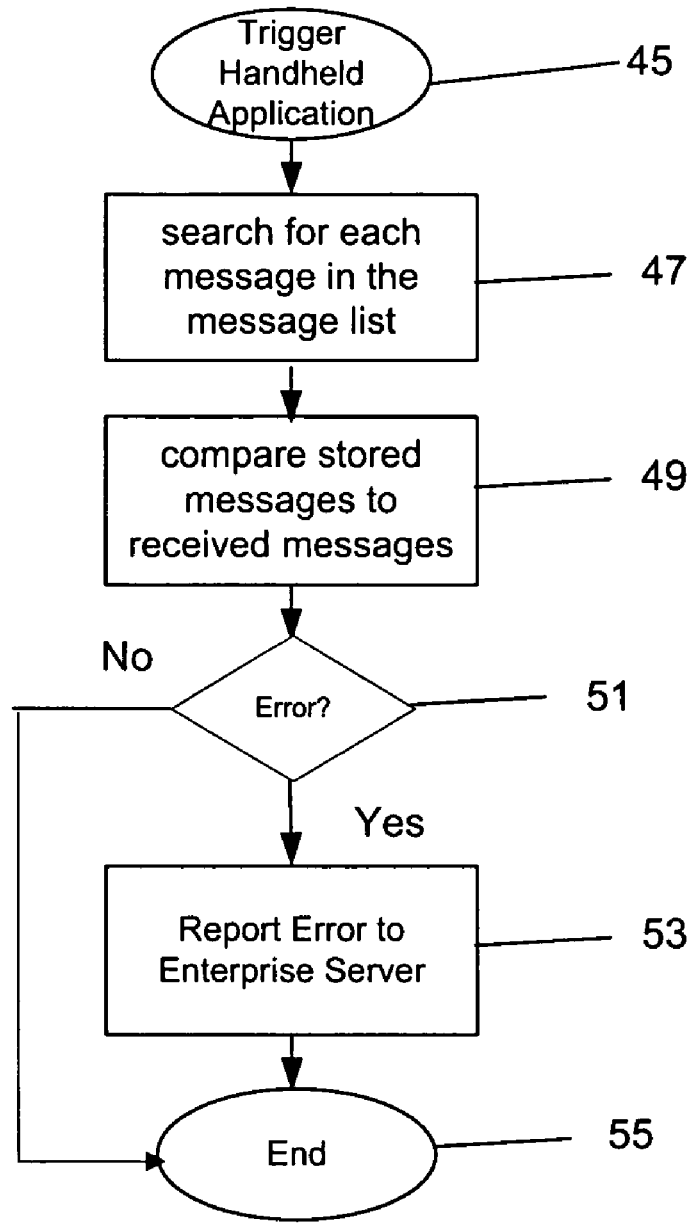
FIG. 5 is a flowchart showing execution of a handheld device process according to the preferred embodiment.

After the script has completed execution (step 41), an application within device 19 is then executed, as shown in FIG. 5. The handheld application is triggered either by a message from the script indicating that all of the test messages have been sent, or manually by the administrator (step 45). The device side application searches for each message in the message list on the handheld device 19 (step 47) and compares the stored messages to the actual messages received on the handheld device 19 (step 49). If any errors detected (step 51), the errors are saved in a "badMsgs.nsf" file on the device 19, and reported to a debugging program 29 on enterprise server 1A (step 53). The script uses the results from the handheld device application to generate the text log files ("debuglog" 25 in FIG. 2). As discussed above, these log files can then be emailed to the administrators (testers or other stakeholders) from the client side script. Messages can be traced by their NoteIDs in the debuglog file.

The data specifying the stored messages on the handheld device 19 can be loaded onto the handheld device before executing the script or, in the alternative, can be sent wirelessly to the handheld device. This data is automatically generated by the script based on the database it uses to send data from (e.g. the database 21 in the embodiment of FIG. 2).

The contents of the log file are presented in the following format:

Test Results Report Starting @06/02/2003 09:46:03 AM EDT
Result for message with NoteIDs=8F6/198E:
Message 8F6/198E appeared to be delivered successfully
Result for message with NoteIDs=EBA/1992:
Message EBA/1992 appeared to be delivered successfully
Result for message with NoteIDs=EBE/1996:
Message EBE/1996 appeared to be delivered successfully
Result for message with NoteIDs=EC2/199A:
Enterprise Server potentially encountered problem when delivering message EC2/199A->EBE
Result for message with NoteIDs=EC6/199E:
Enterprise Server potentially encountered problem when delivering message EC6/199E->EC2
Result for message with NoteIDs=ECA/19A2:
Enterprise Server potentially encountered problem when delivering message ECA/19A2->EC6
Result for message with NoteIDs=ECE/19A6:
Enterprise Server potentially encountered problem when delivering message ECE/19A6->ECA.

As discussed above, each message can be identified by the NoteIDs in the three databases: msgStore.nsf, user's mail file, and badMsgs.nsf (for those test messages that resulted in errors). For example, message 8F6/198E is indicated as having been delivered successfully (where "8F6" is the NoteID of the message in the msgstore.nsf, and "198E" is the NoteID of the message in the user's mail file). On the other hand, the enterprise server encountered a problem when delivering message EC2/199A->EBE (where "EC2" is the NoteID of the message in the msgStore.nsf, "199A" is the NoteID of the message in the user's mail file, and "EBE" is the NoteID of the message in the badMsgs.nsf).

The administrator is left with the relatively simple task of reviewing the log to identify messages that caused errors and then taking appropriate corrective action on the server 1A. Typically, the administrator then manually tests the message that caused the problem in order to investigate the source of the problem. Since the testing is fully automated by the script, the administrator can run the script overnight or at some other convenient time since there is no need to personally oversee the testing (apart from analyzing the results of the testing afterward). The process set forth herein drastically reduces the amount of time required to test messaging as compared to manual testing of the email function.

A person skilled in the art, having read this description of the preferred embodiment may conceive of variations and alternative embodiments. The process set forth herein can, for example, be modified to test specific messages that are required by a test plan. Moreover, data (other than messages) can also be retrieved and compared from other handheld applications, such as the calendar, in the same manner. For each message compared, the handheld device 19 sends results to the client side script.

All such variations and alternative embodiments are believed to be within the ambit of the claims appended hereto.

What is claimed is:
1. A communication system comprising:
an e-mail server;
at least one mobile communication device; and
an enterprise server for interacting with said e-mail server for facilitating communications and delivery of services to said at least one mobile communication device;

said enterprise server configured to execute an automated script for testing said enterprise server, said automated script associated with a mail account on the e-mail server;

said enterprise server further configured, responsive to execution of said automated script, to copy test messages from a test database at said e-mail server to a database of said mail account at said e-mail server; and said enterprise server further configured, responsive to copying said test messages, to automatically send a plurality of said test email messages to said at least one mobile communication device.

2. The communications system of claim 1, wherein said enterprise server is arranged to poll the database of said mail account within the e-mail server for new messages, to detects said test messages as being new messages and in response to sends said plurality of test messages to said at least one of said mobile communication devices.

3. The communication system of claim 1, wherein said test messages comprise a variety of subject, body, and recipient combinations.

4. The communication system of claim 3, wherein said variety of subject, body, and recipient combinations comprises at least one of a message with subject and no body, a message with no subject and no body, a message with a large body and small subject, a message with a large body and large subject, a message with a small body and large subject, a message with a small body and small subject, a message with a subject and body comprising only characters, a message with a subject and body comprising only symbols, a message with a messages with only a cc'd user, a message with only a bcc'd user, or a message with an attachment.

5. The communication system of claim 2, wherein said test messages comprise a variety of subject, body, and recipient combinations.

6. The communication system of claim 5, wherein said variety of subject, body, and recipient combinations comprises at least one of a message with subject and no body, a message with no subject and no body, a message with a large body and small subject, a message with a large body and large subject, a message with a small body and large subject, a message with a small body and small subject, a message with a subject and body comprising only characters, a message with a subject and body comprising only symbols, a message with a messages with only a cc'd user, a message with only a bcc'd user, or a message with an attachment.

7. An apparatus comprising:

an enterprise server for interacting with an e-mail server and with at least one mobile communication device for facilitating communications and delivery of services to said at least one mobile communication device;

said enterprise server configured to execute an automated script installed thereon for testing said enterprise server, said automated script associated with a mail account on the e-mail server;

said enterprise server further configured, responsive to executing said automated script, to copy test messages from a test database at said e-mail server to a database of said mail account at said e-mail server; and said enterprise server further configured, responsive to copying said test messages, to automatically send a plurality of said test email messages to said at least mobile communication device.

8. The enterprise server of claim 7, wherein said enterprise server is arranged to poll the database of said mail account within the e-mail server for new messages to thereby automatically send said plurality of test messages.

* * * * *